US00RE37848E

(19) United States
(12) Reissued Patent
Nanami et al.

(10) Patent Number: US RE37,848 E
(45) Date of Reissued Patent: Sep. 17, 2002

(54) EXHAUST CLEANING SYSTEM FOR MARINE PROPULSION ENGINE

(75) Inventors: Masayoshi Nanami; Atsushi Isogawa; Masahiro Honda, all of Hamamatsu (JP)

(73) Assignee: Sanshin Kogyo Kabushiki Kaisha (JP)

( * ) Notice: This patent issued on a continued prosecution application filed under 37 CFR 1.53(d), and is subject to the twenty year patent term provisions of 35 U.S.C. 154(a)(2).

(21) Appl. No.: 08/752,854

(22) Filed: Nov. 21, 1996

Related U.S. Patent Documents

Reissue of:
(64) Patent No.: 5,366,401
Issued: Nov. 22, 1994
Appl. No.: 08/071,477
Filed: Jun. 4, 1993

(30) Foreign Application Priority Data

Jul. 10, 1992 (JP) ..... 4-207208

(51) Int. Cl.[7] ..... B63H 21/32
(52) U.S. Cl. ..... 440/89; 60/299
(58) Field of Search ..... 440/88, 89, 900; 181/220, 221, 235; 60/282, 298, 299, 302

(56) References Cited

U.S. PATENT DOCUMENTS

| | | | |
|---|---|---|---|
| 4,353,208 | A | 10/1982 | Völker et al. |
| 4,735,046 | A | 4/1988 | Iwai |
| 4,773,883 | A | 9/1988 | Nakase et al. |
| 4,787,869 | A | 11/1988 | Shiozawa |
| 4,811,560 | A | 3/1989 | Nakase et al. |
| 4,957,461 | A | 9/1990 | Nakayama |
| 4,965,997 | A | 10/1990 | Suzuki et al. |
| 4,989,409 | A | 2/1991 | Nakase et al. |
| 4,997,399 | A | 3/1991 | Nakayasu et al. |
| 5,067,448 | A | 11/1991 | Nakase et al. |
| 5,078,631 | A | 1/1992 | Harbert |
| 5,096,446 | A | 3/1992 | Tazaki et al. |
| 5,167,934 | A | 12/1992 | Wolf et al. |
| 5,212,949 | A | 5/1993 | Shiozawa |
| 5,234,364 | A | 8/1993 | Ito |
| 5,251,439 | A | 10/1993 | Nakase et al. |
| 5,280,708 | A | 1/1994 | Sougawa et al. |
| 5,306,185 | A | 4/1994 | Lassanske et al. |
| 5,324,217 | A | 6/1994 | Mineo |

FOREIGN PATENT DOCUMENTS

| | | |
|---|---|---|
| DE | 2345383 | 3/1975 |
| JP | 52-8932 | 3/1977 |
| JP | 55-10043 | * 4/1980 |
| JP | 55-12233 | * 11/1980 |
| JP | 2-256814 | 10/1990 |
| JP | 2-256817 | 10/1990 |

* cited by examiner

*Primary Examiner*—Stephen Avila
(74) *Attorney, Agent, or Firm*—Knobbe, Martens, Olson & Bear, LLP

(57) ABSTRACT

An exhaust cleaning system for a marine propulsion engine that includes a catalyst positioned within a tube that communicates with an expansion chamber. A cooling jacket extends around at least a portion of the exhaust system and the liquid coolant is discharged into the exhaust system for flow with the exhaust gases. A number of different arrangements are shown for precluding the coolant from flowing back into the exhaust system and contacting the catalyst bed either when the watercraft is inverted and righted or in the event the engine is stopped and restarted.

100 Claims, 6 Drawing Sheets

EXHAUST CLEANING SYSTEM FOR MARINE PROPULSION ENGINE

Matter enclosed in heavy brackets [ ] appears in the original patent but forms no part of this reissue specification; matter printed in italics indicates the additions made by reissue.

BACKGROUND OF THE INVENTION

This invention relates to an exhaust cleaning system for a [mrine] *marine* propulsion engine and particularly to a catalytic exhaust system for such an engine.

In watercraft it is well known that the exhaust gases from the powering internal combustion engine are silenced and cooled by an exhaust system which may include a water jacket that surrounds at least a part of the exhaust system and/or by the discharge of liquid coolant into the exhaust gases for discharge back into the body of water in which the watercraft is operating along with the exhaust gases. The exhaust gas discharge is either disposed below the water level or in proximity to it. Although this type of exhaust system is quite advantageous, there are some disadvantages with it and certain problems which may arise.

For example, it is desirable to provide a catalyzer in the exhaust system so as to insure against the emission of unwanted exhaust gas constituents either into the atmosphere or into the body of water in which the watercraft is operating. Catalyzers are particularly useful in conjunction with two cycle engines wherein there may be lubricating oil mixed with the exhaust gases. The catalyzer can render the lubricating oil relatively harmless to the amorphous in addition to treating the exhaust gases themselves.

However, most catalyzers operate with ceramic type beds and if any water strikes the catalyzer bed, the bed can shatter or become damaged. This is particularly true because of the high temperature at which the catalyzer bed must be at to be operative. These problems are particularly acute with certain types of watercraft which, by their sporting nature, may be capsized and easily righted. During such capsizing operation, water can enter the exhaust system and when the watercraft is again righted, the water can flow back to the catalyzer and cause it damage, as aforenoted.

FIG. 1 of the drawings shows a small watercraft of the type with which the problem aforenoted is particularly relevant, with the watercraft being identified generally by the reference numeral 11. The watercraft 11 includes a hull 12 having a rearwardly positioned seat 13 on which one or more riders may sit in straddle, tandem fashion. A watercraft control, such as a handle bar assembly 14, is positioned forwardly of the seat 13 for controlling the steering of the watercraft and the speed.

The watercraft hull 12 defines an engine compartment that is positioned forwardly of the seat 13 and which contains an internal combustion engine 14 of any known type. For example, the engine 14 may be a two cylinder in-line engine operating on the two stroke principal. The engine 14 has a drive shaft that coupled to an impeller shaft of a jet propulsion unit, indicated generally by the reference numeral 15 and positioned in a tunnel 16 at the rear underside of the hull 12 for powering the watercraft 11 in a known manner.

Conventionally, the engine 14 is provided with an exhaust system which transfers the exhaust gases from the exhaust port to an exhaust discharge and a portion of this exhaust system constructed in accordance with a prior art type of construction is shown in FIG. 2. As may be seen in this figure, the engine 14 has a pair of exhaust ports 17 that discharge into a combined exhaust manifold and expansion chamber 18. An exhaust elbow, indicated generally by the reference numeral 19 delivers these exhaust gases to a further expansion chamber device, indicated generally by the reference numeral 21. It should be noted that the exhaust manifold 18, exhaust elbow 19 and expansion chamber device all have a double walled construction and form respective cooling jackets 22, 23 and 24 each of which receive coolant from the engine 14 in a well known manner. The coolant may be delivered to the cooling jackets 22, 23 and 24 by independent conduits or the coolant may be delivered to one or both of the cooling jackets 22 and 23 in series or parallel fashion from the engine cooling jacket and then delivered to the cooling jacket 24 of the expansion chamber 21.

This coolant from the cooling jackets 22, 23 and 24 is normally discharged back into the exhaust gases that flow from the exhaust port 17 and as may be seen in FIG. 2, the expansion chamber 21 has an inner shell 25 that has a discharge opening 26 that communicates with an outlet pipe 27 but which passes through the cooling jacket 24 so that the engine coolant will be mixed with the exhaust gases as they pass through the exhaust outlet 27. A flexible conduit 28 extends from the exhaust outlet 27 rearwardly as will be described in conjunction with FIG. 1. The cooling jackets 22, 23 and 24 effectively cool the exhaust gases and also insure that the manifold 18, elbow 19 and expansion chamber 21, which are all positioned within the hull 12, will not be overheated.

Referring now again to FIG. 1, it should be seen that the flexible exhaust conduit 28 extends to a water trap device 29 positioned at the rear portion of the hull. The water trap device 29 has an outlet portion 31 that extends to the tunnel 16 so as to deliver the exhaust gases and entrained coolant back to the atmosphere and body of water in which the watercraft is operating.

The type of watercraft 11 is very sporting in nature and can be easily capsized and righted. The water trap device 29 insures that water which may enter the exhaust outlet 31 will not pass back to the exhaust port 17 and interiorly to the engine. However, since coolant from the engine is discharged into the flexible conduit 28, such inversion and righting can cause water from the engine coolant jacket to flow backwardly into the expansion chamber 21, elbow 19 and exhaust manifold 18 and thus possibly enter the engine.

It is desirable to provide a catalyzer, as aforenoted, for treating the exhaust gases and with the aforedescribed construction, water from the cooling jackets 22, 23 and 24 may easily impinge upon the catalyst and damage it.

It, therefore, a principal object to this invention to provide an improved exhaust system for a watercraft wherein a catalyzer may be employed and the catalyzer will be protected from possible damage from the coolant present in the exhaust system and/or water from the body of water in which the watercraft is operating.

It is a further object of this invention to provide an improved catalytic exhaust cleaning system for a marine propulsion engine.

It is a yet further object of this invention to provide an improved exhaust cleaning system for an engine that embodies a catalyzer and an effective device for insuring that the exhaust system may be partially cooled by the engine coolant but this engine coolant cannot come into contact with the catalyzer.

SUMMARY OF THE INVENTION

This invention is adapted to be embodied in a an exhaust system for a watercraft that is comprised of a hull containing an internal combustion engine and having at least one exhaust port. The exhaust system is comprised of an exhaust conduit having an inlet end communicating with the exhaust port for receiving exhaust gases therefrom and an outlet end for discharging the exhaust gases to the atmosphere in proximity to the body of water in which the watercraft is operating in at least some conditions of the watercraft. The exhaust conduit includes means defining an expansion chamber and a tube containing a catalyzer bed communicating at one end with the expansion chamber and through which the exhaust gases must pass. Means are provided for precluding water in the exhaust conduit from entering the tube end and impinging on the catalyzer bed.

BRIEF OF THE DRAWINGS

DETAILED DESCRIPTION OF THE PREFERRED EMBODIMENTS OF THE INVENTION

Figure 2:
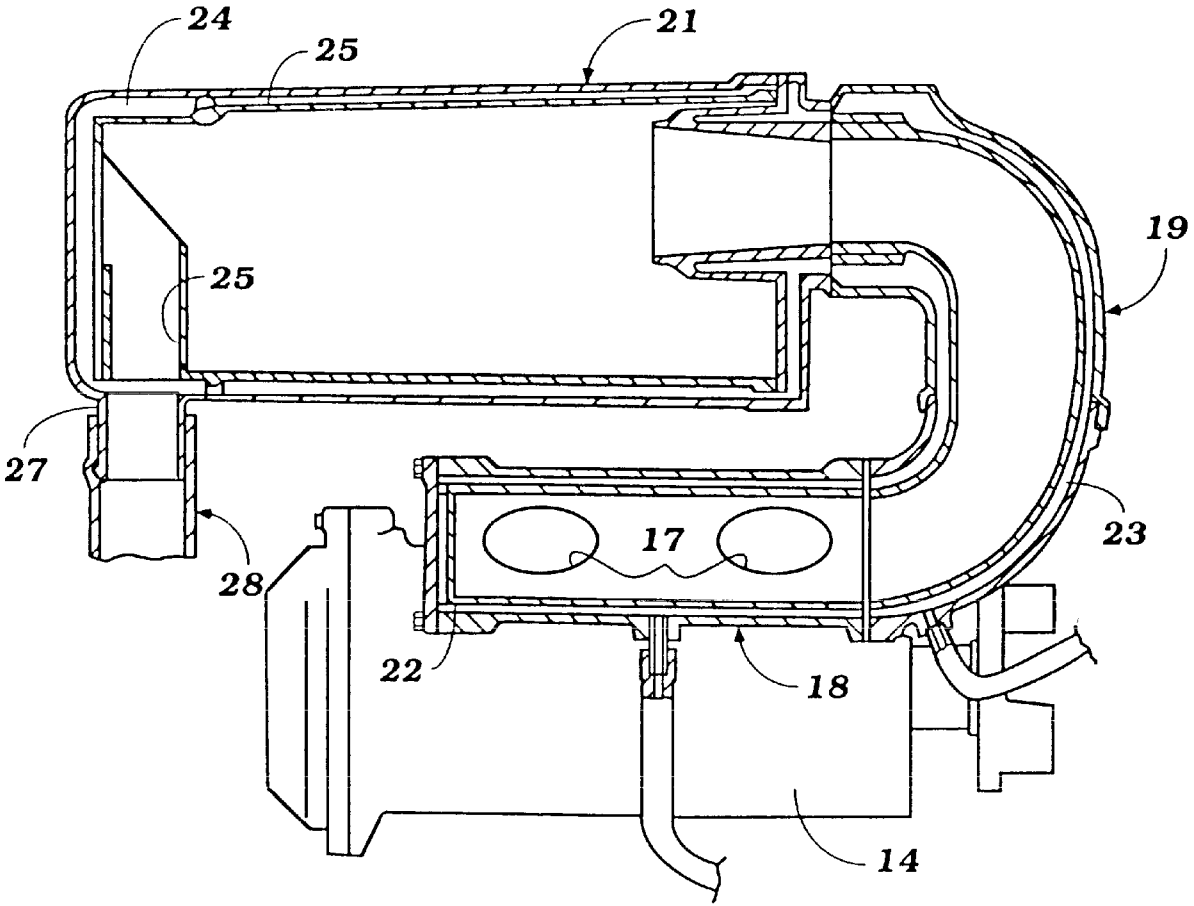
Figure 2 Prior Art
FIG. 2 is a partial cross sectional view showing a prior art type of exhaust system for a watercraft of the type shown in FIG. 1.

Before proceeding to a detailed description of the four preferred embodiments of the invention as specifically illustrated in FIGS. 3 through 6, it should be noted that these figures show a similar area as that shown in FIG. 2 and embody some components which are the same or substantially the same as the prior art type of construction. Where that is the case, these components which are the same or substantially the same as those employed in the prior art have been identified by the same reference numerals and will be described again only insofar as is necessary to understand the construction and operation of the various preferred embodiments.

Basically, the invention deals with portions for replacing the expansion chamber 21 and its communication with the flexible conduit 28. A first embodiment of construction of this type is show in FIG. 3 and includes an expansion chamber, indicated generally by the reference numeral 51. The expansion chamber 51 is provided with an inner wall portion 52 that defines a first expansion chamber 53 that communicates directly with the exhaust elbow 19 through a megaphone section 54. A second expansion chamber portion 55 is spaced from the first expansion chamber portion 53 with the expansion chamber portions 53 and 55 having facing walls 56 through which a tube 57 extends for transfer of exhaust gases from the expansion chamber 53 to the expansion chamber 55. A catalyzer bed 58 of a suitable configuration is positioned within the tube 57 so that all exhaust gases passing from the expansion chamber 53 to the expansion chamber 55 must come into contact with the catalyzer bed 58.

The expansion chamber device 51 has an outer shell 59 that is spaced from the inner shell 52 and which defines a cooling jacket 61 which receives water from the elbow cooling jacket 23 through a small bleed port 62.

The expansion chamber device 51 has a discharge portion 63 which extends generally at a right angle to the tube 57 and catalyzed bed 58 and which is comprised of an inner pipe 64 which forms a part of the inner shell 52 and an outer pipe that defines a further extension of the cooling jacket 61 around this inner pipe 64. The inner pipe 64 conveys only exhaust gases to a third expansion chamber 65 of an expansion chamber device, indicated generally by the reference numeral 66. The expansion chamber device 66 is formed with an internal baffle 67 for a purpose to be described. Also, an internal baffle 68 may be provided in the expansion chamber 55 in confronting relationship across the tube 57 for protecting the catalyst bed 58 in a manner which will be described.

The expansion chamber device 66 and specifically its expansion chamber 65 is provided with a discharge port 68 which extend parallel to the inlet port formed by the pipe 64 but which is offset to it. The flexible conduit 28 is connected in communication with the discharge port 68 but spaced outwardly from it to define a water discharge gap 69 through which coolant may be discharged from a cooling jacket 71 formed between the inner shell and an outer shell 72 of the expansion chamber device 66. A further water discharge passage 73 may be provided for discharging some water independently of the exhaust gases.

Figure 1:
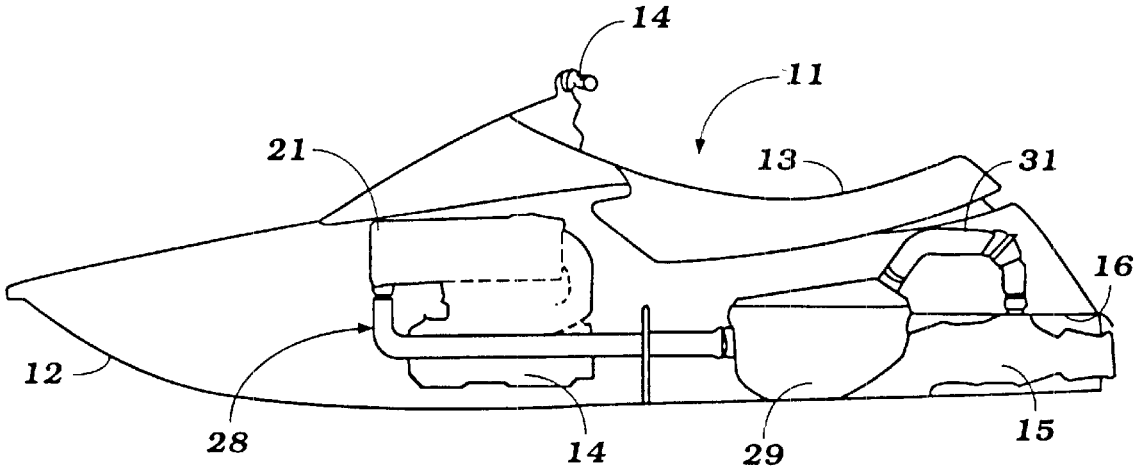
FIG. 1 is a side elevation view of a watercraft showing the environment of the invention with portions broken away so as to show the engine and its exhaust system and the jet propulsion unit in solid lines.

As should be readily apparent, the water trap device 29 (FIG. 1) will insure that water from the body of water in which the watercraft is operating cannot flow forwardly to contact the catalyst bed 58 if the water trap becomes inverted and is again righted. However, since coolant from the cooling jackets 22, 23, 61 and 71 are discharged into the exhaust conduit 28, if the watercraft is inverted and the engine is stopped there can be water accumulate in the exhaust conduit 28. The construction is such to insure that this water, however, cannot contact the catalyst bed 58 upon such inversion and/or righting.

First, the pipes 64 and 69 of the expansion chamber device 66 are offset from each other and the pipe 64 extends into the expansion chamber 65 so that any water that accumulates therein in an inverted state cannot pass into the pipe 64. Further, the offsetting and the interposed baffle 67 will insure that water cannot pass directly from the pipe 68 to the pipe extension 64. Furthermore, any water which may somehow pass back into the expansion chamber 55 will be prevented from impending on the catalyst bed 58 by the further baffle 68. Hence, the catalyzer material is well protected and damage will not occur.

Figure 3:
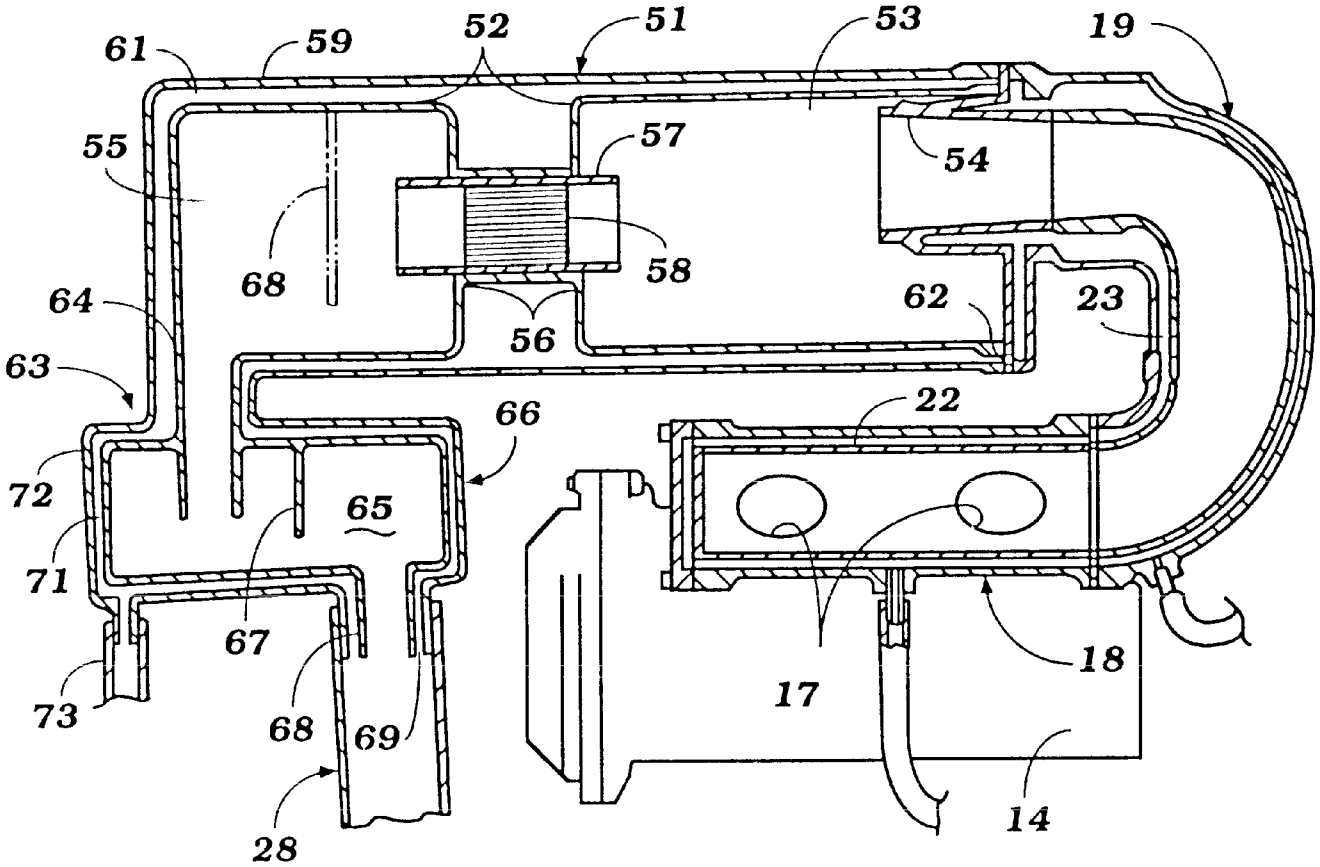
FIG. 3 is a cross sectional view, in part similar to FIG. 2, and shows a first embodiment of the invention.
Figure 4:
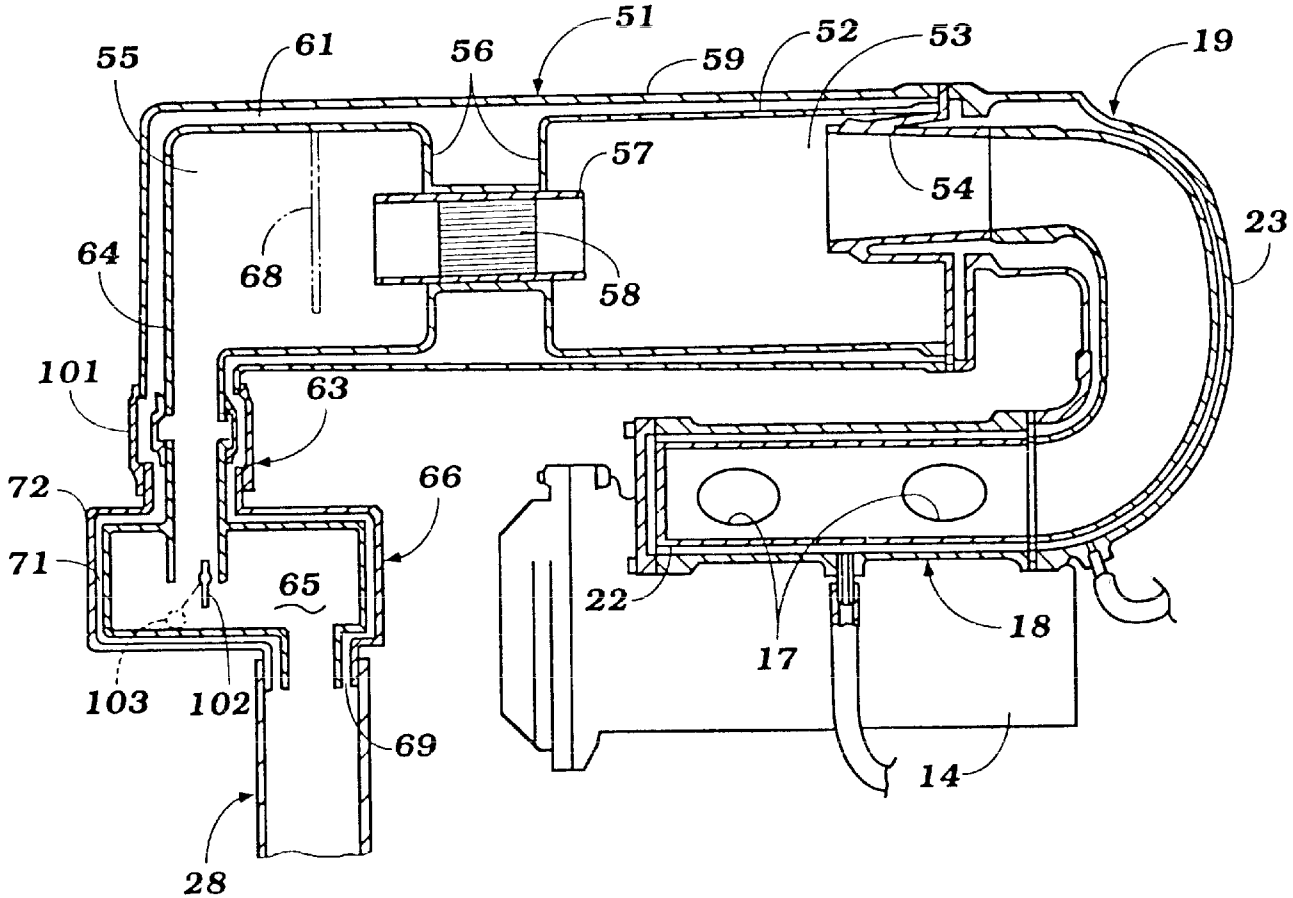
FIG. 4 is a cross sectional view, in part similar to FIGS. 2 and 3, and shows a second embodiment of the invention.

FIG. 4 shows another embodiment which is basically similar to the embodiment of FIG. 3 and, therefore, components of this embodiment which are the same or substantially the same as the previously described embodiment have been identified by the same reference numerals and will be described again only insofar as is necessary to understand the construction and operation of this embodiment.

In this embodiment, the construction of the interior of the expansion chamber device 66 differs slightly from that of the embodiment of FIG. 3 and thus only this portion of the construction need be described in detail. It should be noted, however, that a flexible joint 101 is provided in the conduit 63 that interconnects the expansion chamber 51 with the expansion chamber device 66. In this embodiment, a gravity biased valve 102 having a pendulum mass 103 is positioned in confronting relationship to the extension of the pipe 64 that extends into the expansion chamber 65. The pendulum 103 normally biases the valve 102 to its open position. However, if the watercraft becomes inverted, the pendulum 103 will close the valve 102 and preclude any water which may enter the expansion chamber 65 from passing into the pipe section 64 and into the expansion chamber 55. Again, the baffle 68 further assist in insuring that any water which may escape into this area will not impinge upon the catalyst bed 58. When the watercraft is righted, the water can drain out of the expansion chamber 65 into the conduit 28 and the valve 102 will then be biased back to its open position by the gravity. Hence, this embodiment is also effective in insuring good protection for the catalyst bed 58.

Figure 5:
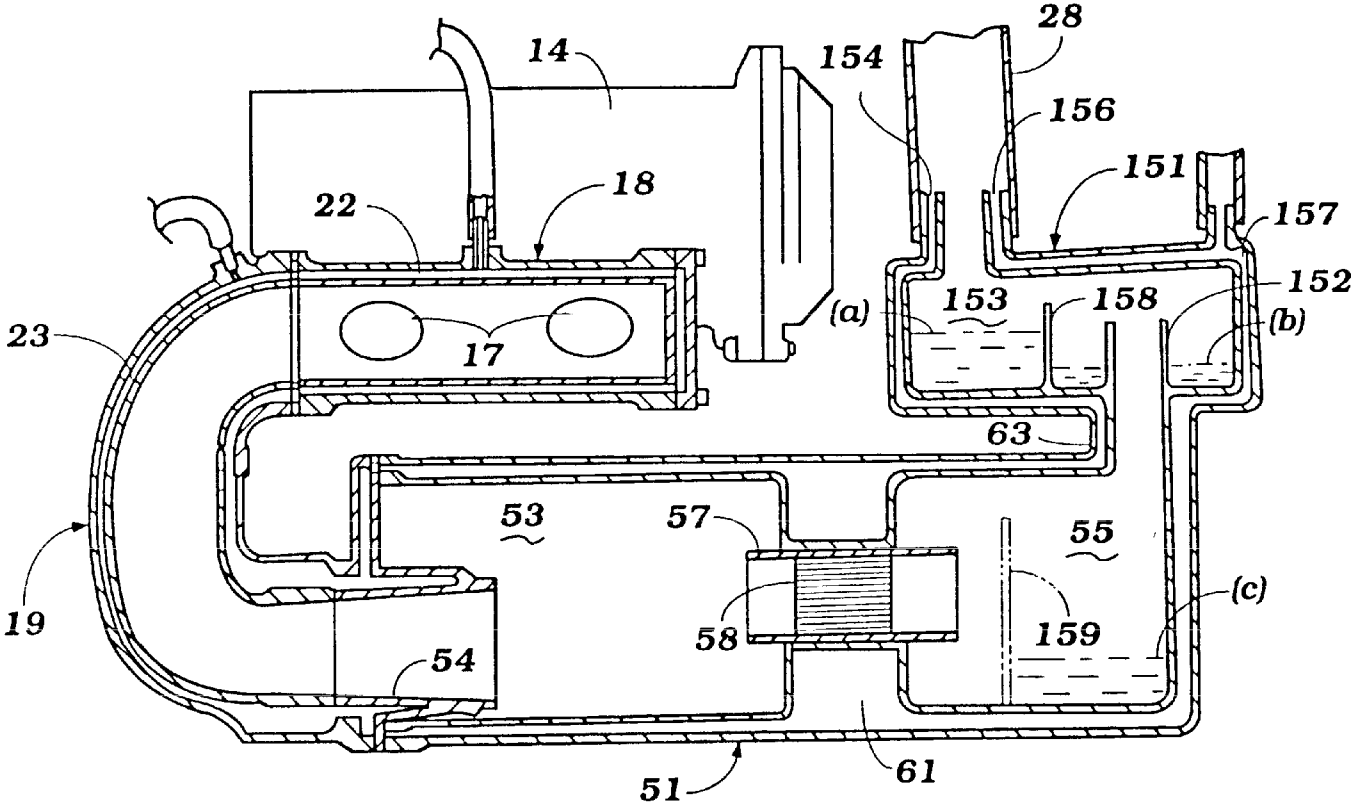
FIG. 5 is a cross sectional view, in part similar to FIGS. 2, 3 and 4, and shows yet another embodiment of the invention.

In the embodiments of FIGS. 3 and 4, the expansion chamber device 66 has been positioned vertically beneath the expansion chamber device 51. In some arrangements, a reverse positioning may be desirable and FIG. 5 shows an embodiment of such a construction wherein the protection of the catalyst bed 58 is insured. This embodiment has many features in common with those of the embodiments of FIGS. 3 and 4 and where elements are the same or substantially the same, they have been identified by the same reference numerals and will be described again in detail only insofar as is necessary to understand the construction and operation of this embodiment.

In this embodiment, a further expansion chamber device, indicated generally by the reference numeral 151 is positioned vertically above the expansion chamber 55 of the expansion chamber device 51. A vertically upwardly extending pipe section 152 interconnects the expansion chamber 55 with an expansion chamber 153 formed by the expansion chamber device 151. The expansion chamber 153 communicates with the flexible conduit 28 through a pipe section 154 with a water flow gap 156 being positioned therebetween.

A cooling jacket 157 through which coolant from the cooling jacket 61 of the expansion chamber device 51 may flow is provided. This coolant will normally flow under the pressure of the exhaust gases out of the flexible conduit 28. However, if the engine is stopped due to either inversion and righting of the watercraft or for any other reason, coolant may flow back into the expansion chamber 53.

To prevent this coolant from impacting on the catalyst bed 58, this is provided a vertically extending baffle 158 in the expansion chamber 53 that defines a first well "a" to one side of the pipe extension 152 in which water may accumulate to the illustrated level. If water flows over the top of the baffle 158 it will be collected in a further well "b" formed around the extension of the pipe 152 and thus trapped so that it will not flow into the expansion chamber 55 which is now vertically below it.

For further protection, a baffle 159 may be provided in the expansion chamber 55 that provides a still further well "c" in which water may accumulate. Thus, the series of water traps in this system will insure that water cannot impinge upon the catalyst bed 58. In addition, the baffles 158 and 159, pipe extension 152 and offset of the pipes 152 and 154 will assist in insuring that water cannot return back in the exhaust system and impact on the catalyst bed 58. Of course, once the engine is restarted, any water accumulating in the wells a, b and c will be vaporized and pass out of the flexible conduit 28 back into the atmosphere or body of water in which the watercraft is operating.

Figure 6:
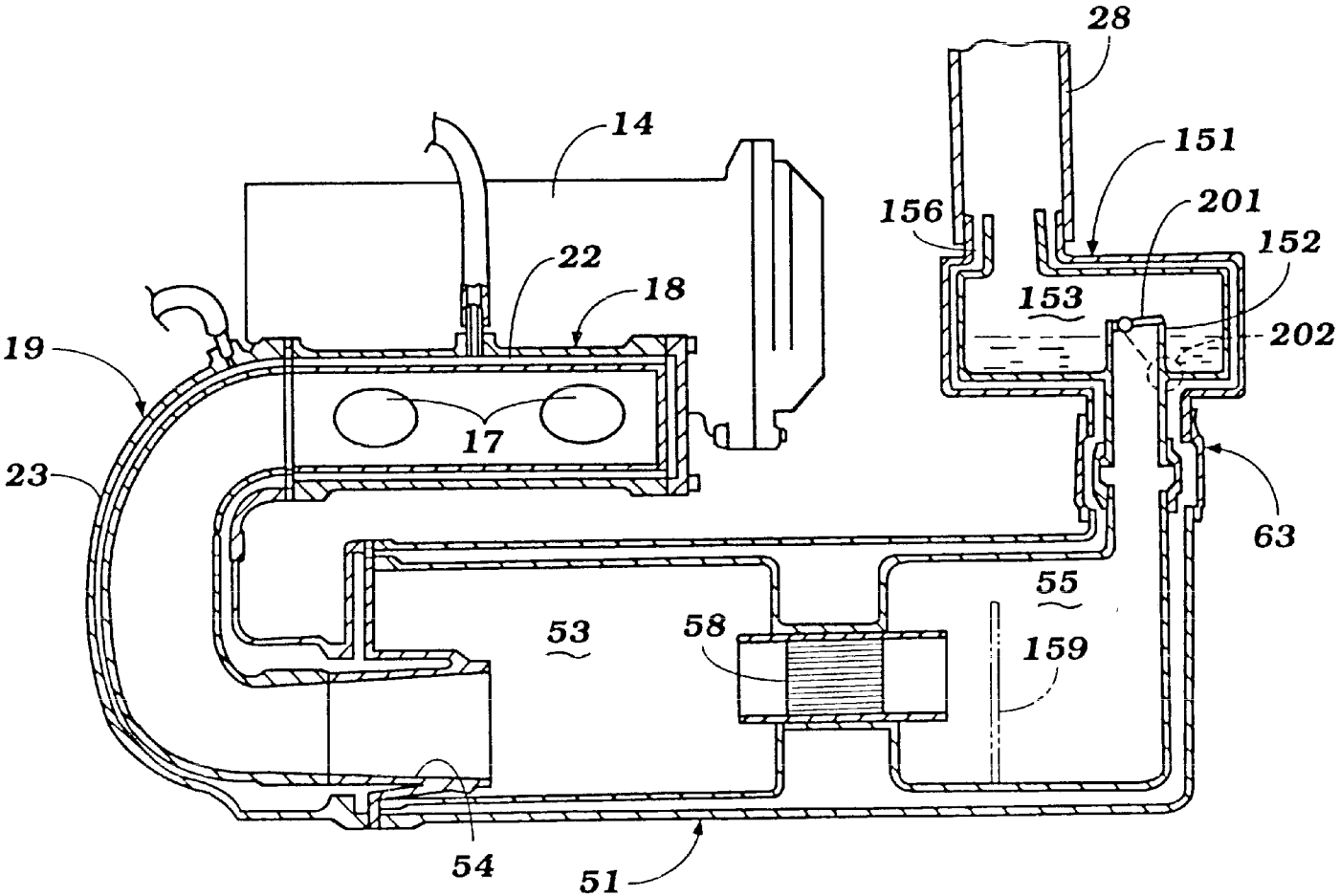
FIG. 6 is a cross sectional view, in part similar to FIGS. 2 through 5, and shows a further embodiment of the invention.

FIG. 6 shows another embodiment of the invention which has the same relationship to the embodiment of FIG. 5 with the embodiment of FIG. 4 has to FIG. 3. That is, rather than baffling in the further expansion chamber device 161, water protection is provided by employing a gravity biased valve. Because this is the main distinction between the embodiments of FIGS. 5 and 6, only this different construction will be described and components which are the same or substantially the same have been identified by the same reference numerals.

In this embodiment, the connecting section 63 between the expansion chamber device 51 and the expansion chamber 155 includes a flexible coupling. The pipe extension 152 has associated with it a control valve 201 which is offset relative to its pivot axis and which is biased to a close position by a pendulum mass 202. In this construction, when the engine is running the pressure of the exhaust gases will cause the valve 201 to open and normal exhaust flow can occur. However, the minute the engine 14 stops, the valve 201 will pivot to its closed position under the operation of the pendulum 202 and any water which may accumulate in the expansion chamber 153 cannot flow back into the expansion chamber 55 nor will it be able to contact the catalyst bed 58.

It should be readily apparent from the foregoing description that the described embodiments of the invention are extremely effective in insuring good catalytic treatment of the exhaust gases of a small watercraft which may become inverted and righted and which has coolant discharged into the exhaust system. However, the construction is such that no water can reach and damage the catalyst bed regardless of whether the watercraft is inverted and righted or not. Of course, the foregoing description is that of preferred embodiments of the invention and various changes and modifications may be made without departing from the spirit and scope of the invention, as defined by the appended claims.

We claim:

1. An exhaust system for a watercraft comprised of a hull containing an internal combustion engine mounted within said hull and having at least one exhaust port, said exhaust system being comprised of an exhaust conduit having an inlet end communicating with said exhaust port for receiving exhaust gases therefrom and an outlet end exiting through said hull for discharging the exhaust gases to the atmosphere in proximity to the body of water in which the watercraft is operating in at least some conditions of said watercraft, said exhaust conduit including means defining an expansion chamber and a tube containing a catalyst bed contained within said expansion chamber and through which exhaust gases must pass, and means for precluding water in said exhaust conduit from entering said tube end.

2. An exhaust system for a watercraft as set forth in claim 1 wherein the means for precluding water from entering the tube end comprises baffle means.

3. An exhaust system for a watercraft as set forth in claim 2 wherein the baffle means is positioned in the expansion chamber in confronting relationship to the tube end.

4. An exhaust system for a watercraft as set forth in claim 2 wherein the baffle means is disposed downstream of the expansion chamber in the exhaust conduit.

5. An exhaust system for a watercraft as set forth in claim 1 wherein the means for precluding water in the exhaust conduit from entering the tube end comprises valve means.

6. An exhaust system for a watercraft as set forth in claim 5 wherein the valve means is positioned downstream of the expansion chamber.

7. An exhaust system for a watercraft as set forth in claim 6 wherein the valve means is moveable between an open position and a closed position and is biased to one of said positions.

8. An exhaust system for a watercraft as set forth in claim 7 wherein the valve means is biased to its closed position and is opened by the pressure of the exhaust gases when the engine is running.

9. An exhaust system for a watercraft as set forth in claim 7 wherein the valve means is biased to its opened position and is closed in response to inversion of the watercraft.

10. An exhaust system for a watercraft as set forth in claim 1 wherein the means for precluding water in the exhaust conduit from entering the tube end comprises a further expansion chamber disposed downstream in the exhaust conduit from the first mentioned expansion chamber.

11. An exhaust system for a watercraft as set forth in claim 10 wherein the first expansion chamber communicates with the second expansion chamber through a first pipe section and the second expansion chamber communicates with the downstream end of the exhaust conduit with a second pipe section and wherein the first and second pipe sections are offset relative to each other.

12. An exhaust system for a watercraft as set forth in claim 10 wherein there is provided baffle means in the further expansion chamber for precluding water from [impending] *impinging* on the catalyst bed.

13. An exhaust system for a watercraft as set forth in claim 12 wherein the first expansion chamber communicates with the second expansion chamber through a first pipe section and the second expansion chamber communicates with the downstream end of the exhaust conduit with a second pipe section and wherein the first and second pipe sections are offset relative to each other.

14. An exhaust system for a watercraft as set forth in claim 13 further including valve means for controlling the flow through one of the pipe sections.

15. An exhaust system for a watercraft as set forth in claim 14 wherein the valve means is disposed in the first pipe section.

16. An exhaust system for a watercraft as set forth in claim 15 wherein the valve means is moveable between an open position and a closed position and is biased to one of said positions.

17. An exhaust system for a watercraft as set forth in claim 16 wherein the valve means is biased to its closed position and is opened by the pressure of the exhaust gases when the engine is running.

18. An exhaust system for a watercraft as set forth in claim 16 wherein the valve means is biased to its opened position and is closed in response to inversion of the watercraft.

19. An exhaust system for a watercraft as set forth in claim 10 further including means in the expansion chamber to form a well in which water may accumulate.

20. An exhaust system for a watercraft as set forth in claim 19 wherein the expansion chamber includes a pipe section around which the well is formed.

21. An exhaust system for a watercraft as set forth in claim 20 further including means in the additional expansion chamber for forming a further well in which water may accumulate to a level higher than that of the pipe section.

22. An exhaust system for a watercraft as set forth in claim 1 wherein the [tub] *tube* divides the expansion chamber into two expansion chamber sections.

23. An exhaust system for a watercraft as set forth in claim 22 wherein *both sections of* the expansion chamber are formed in a common housing.

24. An exhaust system for a watercraft as set forth in claim 23 further including means defining a cooling jacket around the expansion chamber.

25. An exhaust system for a watercraft as set forth in claim 24 wherein the cooling jacket further encircles the pipe.

26. An exhaust system for a watercraft as set forth in claim 24 wherein the means for precluding water from entering the tube end comprises baffle means.

27. An exhaust system for a watercraft as set forth in claim 26 wherein the baffle means is positioned in the expansion chamber in confronting relationship to the tube end.

28. An exhaust system for a watercraft as set forth in claim 26 wherein the baffle means is disposed downstream of the expansion chamber in the exhaust conduit.

29. An exhaust system for a watercraft as set forth in claim 24 wherein the means for precluding water in the exhaust conduit from entering the tube end comprises valve means.

30. An exhaust system for a watercraft as set forth in claim 29 wherein the valve means is positioned downstream of the expansion chamber.

31. An exhaust system for a watercraft as set forth in claim 30 wherein the valve means is moveable between an open position and a closed position and is biased to one of said positions.

32. An exhaust system for a watercraft as set forth in claim 31 wherein the valve means is biased to its closed position and is opened by the pressure of the exhaust gases when the engine is running.

33. An exhaust system for a watercraft as set forth in claim 31 wherein the valve means is biased to its opened position and is closed in response to inversion of the watercraft.

34. An exhaust system for a watercraft as set forth in claim 24 wherein the means for precluding water in the exhaust conduit from entering the tube end comprises a further expansion chamber disposed downstream in the exhaust conduit from the first mentioned expansion chamber.

35. An exhaust system for a watercraft as set forth in claim 34 wherein the first expansion chamber communicates with the second expansion chamber through a first pipe section and the second expansion chamber communicates with the downstream end of the exhaust conduit with a second pipe section and wherein the first and second pipe sections are offset relative to each other.

36. An exhaust system for a watercraft as set forth in claim 34 wherein there is provided baffle means in the further expansion chamber for precluding water from impending on the catalyst bed.

37. An exhaust system for a watercraft as set forth in claim 36 wherein the first expansion chamber communicates with the second expansion chamber through a first pipe section and the second expansion chamber communicates with the downstream end of the exhaust conduit with a second pipe section and wherein the first and second pipe sections are offset relative to each other.

38. An exhaust system for a watercraft as set forth in claim 37 further including valve means for controlling the flow through one of the pipe sections.

39. An exhaust system for a watercraft as set forth in claim 38 wherein the valve means is disposed in the first pipe section.

40. An exhaust system for a watercraft as set forth in claim 39 wherein the valve means is moveable between an open position and a closed position and is biased to one of said positions.

41. An exhaust system for a watercraft as set forth in claim 40 wherein the valve means is biased to its closed position and is opened by the pressure of the exhaust gases when the engine is running.

42. An exhaust system for a watercraft as set forth in claim 40 wherein the valve means is biased to its opened position and is closed in response to inversion of the watercraft.

43. An exhaust system for a watercraft as set forth in claim 34 further including means in the expansion chamber to form a well in which water may accumulate.

44. An exhaust system for a watercraft as set forth in claim 43 wherein the expansion chamber includes a pipe section around which the well is formed.

45. An exhaust system for a watercraft as set forth in claim 44 further including means in the additional expansion chamber for forming a further well in which water may accumulate to a level higher than that of the pipe section.

*46. An exhaust system for a watercraft as set forth in claim 1 additionally comprising at least one upstanding pipe section being positioned downstream of the catalyst bed.*

*47. An exhaust system for a watercraft as set forth in claim 46 additionally comprising a water trap device which is positioned between the upstanding pipe section and the outlet end.*

*48. An exhaust system for a watercraft as set forth in claim 47 additionally comprising another upstanding pipe section arranged between the water trap device and the outlet end.*

*49. An exhaust system for a watercraft as set forth in claim 48, wherein the pipe section, which is positioned between the water trap device and the outlet end, has a transversely extending section that is connected to the upstanding pipe section, and a downwardly extending section that is connected to the transversely extending section such that the pipe section has a gooseneck-like shape.*

*50. A small watercraft comprising a hull defining a rider's area toward an aft end of the watercraft and including a centrally-located, straddle-type seat that extends generally along the longitudinal axis of the watercraft hull, an internal combustion engine driving a propulsion device to propel the watercraft, said internal combustion engine being mounted within the hull and having at least one exhaust port, and an exhaust system including an inlet end communicating with the exhaust port of the engine for receiving exhaust gases therefrom, and an outlet end exiting through the hull for discharging the exhaust gases to the atmosphere in proximity to the body of water in which the watercraft is operating in at least some conditions of the watercraft, at least a portion of the exhaust system extending beneath the rider's area, a tube through which exhaust gases must flow containing a catalyst bed for treating exhaust gases before discharge through the outlet end, the tube being positioned within an expansion chamber, a water trap device arranged within the exhaust system between the outlet end and the catalyst bed, an exhaust passage communicating with the chamber downstream of the catalyst bed and delivering exhaust gases to the water trap device, and a coolant jacket extending at least along a portion of the chamber, the coolant jacket communicating with the exhaust passage at a point between the catalyst bed and the water trap device so as to introduce at least a portion of the coolant flowing through the coolant jacket into an exhaust gas stream flowing through the exhaust passage.*

*51. A small watercraft as in claim 50, wherein the exhaust passage includes an upstanding section.*

*52. A small watercraft as in claim 50 additionally comprising an exhaust pipe extending between the water trap device and the outlet end, the exhaust pipe having an upstanding section and a transversely extending section.*

*53. A small watercraft as in claim 50 additionally comprising a baffle disposed within the exhaust passage.*

*54. A small watercraft as in claim 50 additionally comprising a valve disposed within the exhaust passage.*

*55. A small watercraft as in claim 50 further comprising a second expansion chamber positioned along the exhaust system upstream of the catalyst.*

*56. A small watercraft as in claim 50 further comprising a second expansion chamber positioned along the exhaust system upstream of the expansion chamber containing the catalyst.*

*57. A small watercraft comprising a hull defining a rider's area toward an aft end of the watercraft and including a centrally-located, straddle-type seat that extends generally along the longitudinal axis of the watercraft hull, an internal combustion engine driving a propulsion device to propel the watercraft, said internal combustion engine mounted within said hull and having at least one exhaust port, and an exhaust system including an inlet end for communicating with said exhaust port of the engine for receiving exhaust gases therefrom, and an outlet end exiting through the hull for discharging the exhaust gases to the atmosphere in proximity to the body of water in which the watercraft is operating in at least some operating conditions of the watercraft, said exhaust system extending through the hull between the inlet and the outlet ends with at least a portion of the exhaust system being disposed beneath the rider's area, a catalyst bed positioned in the exhaust system, the catalyst bed being positioned within a tube through which exhaust gases must flow, the tube being disposed within an expansion chamber, a water trap device arranged within the exhaust system between the outlet end and the catalyst bed to receive a flow of mixed exhaust gases and liquid coolant, an exhaust passage delivering exhaust gases to the water trap device, a first exhaust pipe extending between the catalyst bed and the water trap device and a second exhaust pipe extending between the water trap device and the outlet end, the first and second pipes each having a vertically upstanding portion which inhibits water from entering the catalyst bed.*

*58. A small watercraft as in claim 57 additionally comprising a cooling jacket that is juxtaposed with at least a portion of the exhaust system and through which the liquid coolant flows, the cooling jacket communicating with the first exhaust pipe downstream of the catalyst bed to discharge the liquid coolant into the exhaust pipe for flow with the exhaust gases.*

*59. A small watercraft as in claim 57, wherein the second exhaust pipe has an upstanding section and a transversely extending section.*

*60. A small watercraft as in claim 57 additionally comprising a baffle disposed within the first exhaust pipe.*

*61. A small watercraft as in claim 57 additionally comprising a valve disposed within the first exhaust pipe.*

*62. A small watercraft as in claim 57 further comprising a second expansion chamber positioned along the exhaust system upstream of the catalyst.*

*63. A small watercraft as in claim 57 further comprising a second expansion chamber positioned along the exhaust system upstream of the expansion chamber containing the catalyst.*

*64. A small watercraft comprised of a hull containing an internal combustion engine mounted within the hull and having at least one exhaust port, said hull having a longitudinal axis extending between fore and aft ends of the watercraft, and an exhaust system including an inlet end communicating with the exhaust port of the engine for receiving exhaust gases therefrom, and an outlet end exiting through the hull for discharging the exhaust gases to the atmosphere in proximity to the body of water in which the watercraft is operating in at least some conditions of the watercraft, a section of the exhaust system housing a catalyst bed for treating exhaust gases before discharge through the outlet end, the section of the exhaust system comprising an expansion chamber, the catalyst bed being positioned within a tube through which exhaust gases must flow that is disposed within the expansion chamber, a water trap device arranged within the exhaust system between the outlet end*

*and the catalyst bed, an exhaust passage communicating with the section of the exhaust system downstream of the catalyst bed and delivering exhaust gases to the water trap device, and a coolant jacket communicating with the exhaust passage at a point between the catalyst bed and the water trap device so as to introduce at least a portion of the coolant flowing through the coolant jacket into an exhaust gas stream flowing through the exhaust passage, said water trap device being positioned within the exhaust system behind an aft end of the engine.*

*65. A small watercraft as in claim 64, wherein the exhaust passage includes an upstanding section.*

*66. A small watercraft as in claim 64 additionally comprising an exhaust pipe extending between the water trap device and the outlet end, the exhaust pipe having an upstanding section and a transversely extending section.*

*67. A small watercraft as in claim 64 additionally comprising a baffle disposed within the exhaust passage.*

*68. A small watercraft as in claim 64 additionally comprising a valve disposed within the exhaust passage.*

*69. A small watercraft as in claim 64, wherein said hull defines a rider's area toward an aft end of the watercraft and includes a centrally-located, straddle-type seat that extends generally along the longitudinal axis of the watercraft, and at least a portion of the exhaust system extends beneath the rider's area.*

*70. A small watercraft as in claim 64 further comprising a second expansion chamber positioned along the exhaust system upstream of the catalyst.*

*71. A small watercraft as in claim 64 further comprising a second expansion chamber positioned along the exhaust system upstream of the expansion chamber containing the catalyst.*

*72. A personal watercraft having a hull defining a rider's area sized to accommodate at least one rider, the hull defining an engine compartment containing an internal combustion engine having at least one exhaust port and an output shaft, the engine including a cooling system, a propulsion device carried by the hull on the underside thereof and being driven by the output shaft to propel the watercraft, an exhaust system that extends through at least a portion of the engine compartment to convey exhaust gases from the engine exhaust port to the atmosphere, a catalyzer in the exhaust system to treat exhaust gases before discharge to the atmosphere and a cooling jacket juxtaposing at least a portion of the exhaust system, the cooling jacket discharging at least a portion of the coolant flowing through the cooling jacket to the body of water in which the watercraft is operated through the exhaust system, the catalyzer being located upstream of a point at which the cooling jacket introduces coolant into the exhaust system and downstream of a manifold of the exhaust system, the catalyzer comprising a catalyst bed positioned within a tube through which exhaust gases must flow, the tube being positioned within an expansion chamber of the exhaust system.*

*73. A personal watercraft as in claim 72, wherein at least a portion of the catalyzer is located behind a front end of the engine.*

*74. A small watercraft as in claim 72 further comprising a second expansion chamber positioned along the exhaust system upstream of the catalyst.*

*75. A small watercraft as in claim 72 further comprising a second expansion chamber positioned along the exhaust system upstream of the expansion chamber containing the catalyst.*

*76. A personal watercraft having a hull defining a rider's area so as to accommodate at least one rider, the hull defining an engine compartment containing an internal combustion engine having at least one exhaust port and an output shaft, the engine including a cooling system, a propulsion device carried by the hull on the underside thereof and being driven by the output shaft to propel the watercraft, an exhaust system that extends through at least a portion of the engine compartment to convey exhaust gases from the engine exhaust port to the atmosphere, a catalyzer in the exhaust system to treat the exhaust gases before discharge to the atmosphere, a cooling jacket extending along at least a portion of the exhaust system and releasing at least a portion of coolant flowing in the cooling jacket into the exhaust system, and a discharge conduit connected to the cooling jacket, the discharge conduit being formed separate from the exhaust system, the catalyzer comprising a catalyst bed positioned within a tube through which exhaust gases must flow, the tube being positioned within an expansion chamber of the exhaust system.*

*77. A personal watercraft as in claim 76, wherein the cooling jacket communicates with the cooling system of the engine.*

*78. A personal watercraft as in claim 76, wherein the discharge conduit is arranged to discharge a portion of water flowing through the cooling jacket independent of the exhaust system.*

*79. A personal watercraft as in claim 76, wherein the discharge conduit is attached to the cooling jacket downstream of the catalyzer.*

*80. A personal watercraft as in claim 76, wherein the cooling jacket is configured to discharge at least a portion of the coolant flowing through the cooling jacket into the body of water in which the watercraft is operated through the exhaust system.*

*81. A small watercraft as in claim 76 further comprising a second expansion chamber positioned along the exhaust system upstream of the catalyst.*

*82. A small watercraft as in claim 76 further comprising a second expansion chamber positioned along the exhaust system upstream of the expansion chamber containing the catalyst.*

*83. A personal watercraft having a hull defining a rider's area sized to accommodate at least one rider, the hull defining an engine compartment containing an internal combustion engine having a cylinder block, at least one exhaust port and an output shaft, the engine also including a cooling system, a propulsion device carried by the hull on the underside thereof and being driven by the output shaft to propel the watercraft, an exhaust system that is connected to the cylinder block and that extends through at least a portion of the engine compartment to convey exhaust gases from the engine exhaust port to the atmosphere, a catalyzer in the exhaust system to treat exhaust gases before discharge to the atmosphere and a cooling jacket juxtaposing at least a portion of the exhaust system, the cooling jacket discharging at least a portion of the coolant flowing through the cooling jacket to the body of water in which the watercraft is operated through the exhaust system, the catalyzer being located upstream of a point at which the cooling jacket introduces coolant into the exhaust system and apart from the cylinder block, the catalyzer comprising a catalyst bed positioned within a tube through which exhaust gases must flow, the tube being positioned within an expansion chamber of the exhaust system.*

*84. A personal watercraft as in claim 83, wherein at least a portion of the catalyzer is located behind a front end of the engine.*

*85. A personal watercraft as in claim 83 further comprising a discharge conduit formed separately from the exhaust*

*system, a portion of the coolant flowing through the cooling jacket being diverted from the coolant flow into the discharge conduit prior to the coolant being discharged into the body of water in which the watercraft is operating through the exhaust system.*

*86. A small watercraft as in claim 83 further comprising a second expansion chamber positioned along the exhaust system upstream of the catalyst.*

*87. A small watercraft as in claim 83 further comprising a second expansion chamber positioned along the exhaust system upstream of the expansion chamber containing the catalyst.*

*88. A personal watercraft having a hull defining a rider's area sized to accommodate at least one rider, the hull defining an engine compartment containing an internal combustion engine having at least one exhaust port and an output shaft, the engine including a cooling system capable of drawing water from a body of water in which the watercraft is being operated, a propulsion device carried by the hull on the underside thereof and being driven by the output shaft to propel the watercraft, an exhaust system that extends through at least a portion of the engine compartment to convey exhaust gases from the engine exhaust port to the atmosphere, a catalyzer in the exhaust system to treat exhaust gases before discharge to the atmosphere, the cooling system communicating with the exhaust system such that at least a portion of the water is discharged through the exhaust system to the body of water in which the watercraft is being operated, the catalyzer being located upstream of a point at which the water is introduced into the exhaust system and downstream of a manifold of the exhaust system, the catalyzer comprising a catalyst bed positioned within a tube through which exhaust gases must flow, the tube being positioned within an expansion chamber of the exhaust system.*

*89. A personal watercraft as in claim 88, wherein at least a portion of the catalyzer is located behind a front end of the engine.*

*90. A personal watercraft as in claim 88, wherein the water is introduced from a portion of a cooling jacket that extends along at least a portion of the exhaust system.*

*91. A small watercraft as in claim 88 further comprising a second expansion chamber positioned along the exhaust system upstream of the catalyst.*

*92. A small watercraft as in claim 88 further comprising a second expansion chamber positioned along the exhaust system upstream of the expansion chamber containing the catalyst.*

*93. A personal watercraft having a hull defining a rider's area so as to accommodate at least one rider, the hull defining an engine compartment containing an internal combustion engine having at least one exhaust port and an output shaft, the engine including a cooling system, a propulsion device carried by the hull on the underside thereof and being driven by the output shaft to propel the watercraft, the cooling system receiving water from the propulsion device, an exhaust system that extends through at least a portion of the engine compartment to convey exhaust gases from the engine exhaust port to the atmosphere, a catalyzer in the exhaust system to treat the exhaust gases before discharge to the atmosphere, the cooling system communicating with the exhaust system such that a portion of the water is introduced into the exhaust system and a portion of the water is expelled separate from the exhaust system through a discharge conduit, the catalyzer comprising a catalyst bed positioned within a tube through which exhaust gases must flow, the tube being positioned within an expansion chamber of the exhaust system.*

*94. A small watercraft as in claim 93 further comprising a second expansion chamber positioned along the exhaust system upstream of the catalyst.*

*95. A small watercraft as in claim 93 further comprising a second expansion chamber positioned along the exhaust system upstream of the expansion chamber containing the catalyst.*

*96. A personal watercraft having a hull defining a rider's area sized to accommodate at least one rider, the hull defining an engine compartment containing an internal combustion engine having a cylinder block, at least one exhaust port and an output shaft, the engine also including a cooling system, a propulsion device carried by the hull on the underside thereof and being driven by the output shaft to propel the watercraft, the cooling system receiving water from a body of water in which the watercraft is being operated, an exhaust system that is connected to the cylinder block and that extends through at least a portion of the engine compartment to convey exhaust gases from the engine exhaust port to the atmosphere, a catalyzer in the exhaust system to treat exhaust gases before discharge to the atmosphere and the cooling system communicating with the exhaust system such that at least a portion of the water is introduced into the exhaust system and expelled into the body of water in which the watercraft is being operated through the exhaust system, the catalyzer being located upstream of a point at which the water is introduced into the exhaust system and apart from the cylinder block, the catalyzer comprising a catalyst bed positioned within a tube through which exhaust gases must flow, the tube being positioned within an expansion chamber of the exhaust system.*

*97. A personal watercraft as in claim 96, wherein at least a portion of the catalyzer is located behind a front end of the engine.*

*98. A personal watercraft as in claim 96 further comprising a cooling jacket that extends along at least a portion of the exhaust system, a discharge conduit being formed separately from the exhaust system, and a portion of the coolant flowing through the cooling jacket being diverted from the coolant flow into the discharge conduit prior to the coolant being discharged into the body of water in which the watercraft is operating through the exhaust system.*

*99. A small watercraft as in claim 96 further comprising a second expansion chamber positioned along the exhaust system upstream of the catalyst.*

*100. A small watercraft as in claim 96 further comprising a second expansion chamber positioned along the exhaust system upstream of the expansion chamber containing the catalyst.*

* * * * *